United States Patent [19]
Sawada et al.

[11] Patent Number: 6,019,438
[45] Date of Patent: Feb. 1, 2000

[54] BRAKING SYSTEM FOR A VEHICLE

[75] Inventors: Mamoru Sawada, Yokkaichi; Shuichi Yonemura, Anjo; Youichi Abe, Kariya, all of Japan

[73] Assignee: Denso Corporation, Kariya, Japan

[21] Appl. No.: 08/925,295

[22] Filed: Sep. 8, 1997

[30] Foreign Application Priority Data

| Sep. 10, 1996 | [JP] | Japan | 8-239595 |
| Feb. 6, 1997 | [JP] | Japan | 9-024146 |
| Jul. 17, 1997 | [JP] | Japan | 9-192933 |

[51] Int. Cl.$^7$ ................................ B60T 8/34
[52] U.S. Cl. ................... 303/113.4; 303/114.1
[58] Field of Search .................. 303/10, 116.1, 303/166, 113.3, 113.4, 113.5, 9.62, 119.1, 155, 116.2, 114.1, 24.1, 192

[56] References Cited

U.S. PATENT DOCUMENTS

| 4,812,723 | 3/1989 | Shimizu . | |
| 5,158,343 | 10/1992 | Reichelt et al. . | |
| 5,261,730 | 11/1993 | Steiner et al. . | |
| 5,350,224 | 9/1994 | Nell et al. . | |
| 5,350,225 | 9/1994 | Steiner et al. . | |
| 5,367,942 | 11/1994 | Nell et al. . | |
| 5,586,814 | 12/1996 | Steiner et al. . | |
| 5,607,209 | 3/1997 | Narita et al. | 303/122.11 |
| 5,857,754 | 1/1999 | Fukami et al. | 303/146 |
| 5,890,776 | 4/1999 | Sawada | 306/116.1 |

FOREIGN PATENT DOCUMENTS

| 60-064058 | 4/1985 | Japan . |
| 60-078847 | 5/1985 | Japan . |
| 60-131356 | 7/1985 | Japan . |
| 4-278872 | 10/1992 | Japan . |
| 5-262212 | 10/1993 | Japan . |

*Primary Examiner*—Robert J. Oberleitner
*Assistant Examiner*—Melanie Talavera
*Attorney, Agent, or Firm*—Pillsbury Madison & Sutro LLP

[57] ABSTRACT

A vehicle braking system can, for example when the performance of a booster has deteriorated, reduce a brake pedal depressing force required to obtain a sufficient braking force and thereby lighten the burden on the driver. A booster and a master cylinder generate a brake fluid pressure in correspondence with an operation of a brake pedal. Wheel cylinders connected to the master cylinder generate wheel braking forces in wheels of the vehicle. It is determined if a vehicle braking state corresponds to a state of operation of the brake pedal, and when it is determined that the vehicle braking state does not correspond to the brake pedal operation brake fluid pressure in the wheel cylinders is increased with a pump. In this way, it is possible to obtain a predetermined braking force corresponding to the brake pedal operation at all times.

25 Claims, 14 Drawing Sheets

6,019,438

BRAKING SYSTEM FOR A VEHICLE

CROSS REFERENCE TO RELATED APPLICATION

This application is based upon and claims the benefit of priority of the prior Japanese Patent Applications No. H.8-239595 filed Sep. 10, 1996, No. H.9-24146 filed Feb. 6, 1997, and No. H. 9-192933 filed Jul. 17, 1997, the contents of which are incorporated herein by reference.

BACKGROUND OF THE INVENTION

1. Field of the Invention

This invention relates to a braking system for a vehicle, and particularly to a braking system for a vehicle which adjusts a braking force of the vehicle when a high braking force is needed, for example, when the performance of a booster has deteriorated, when the vehicle is traveling downhill or when the vehicle is heavily loaded.

2. Description of Related Art

Conventionally, a vehicle braking system has been made up of a brake pedal, a booster, a master cylinder, wheel cylinders, and conduits carrying brake fluid. When applying a braking force to the vehicle, a driver depresses the brake pedal. That is, a depressing force applied to the brake pedal is boosted by the booster and transmitted to the master cylinder. The boosted depressing force is converted into a fluid pressure of brake fluid held in the master cylinder, this fluid pressure is transmitted to the wheel cylinders, and a braking force is applied to the vehicle.

The braking force generated at this time is related to the amount by which the brake pedal is operated when the brake pedal is depressed, and a braking force corresponding to the brake pedal operating amount is obtained.

However, when the performance of the booster has deteriorated, because it cannot boost the depressing force on the brake pedal as much as when exhibiting its performance fully, a braking force corresponding to the brake pedal operating amount may not be fully obtained.

Also, the brake pedal operating amount needed to obtain the same deceleration is different when the vehicle is heavily loaded or when it is travelling downhill (hereinafter referred to as heavy load driving) from when the vehicle is not carrying any load (hereinafter referred to as light load driving).

That is, to obtain the same braking force as in light load driving when the performance of the booster has deteriorated or during heavy load driving, it is necessary to make the brake pedal operating amount greater than during light load driving.

In cases like this where the large brake pedal operating amount is required, the necessary depressing force to the brake pedal is large and becomes a burden on the driver. Therefore, for example when the driver is not a physically strong person this burden may be considerable.

Also, in heavy load driving, when the same braking force as in light load driving is expected from the same depressing force to the brake pedal as in light load driving, the expected braking force is not obtained and the braking distance is longer than anticipated.

Furthermore, for example depending on the friction coefficient of brake pads pressed against wheel discs by the wheel cylinders under the action of the brake fluid pressure, the resulting deceleration of the vehicle differs even if the depressing force is the same, i.e. the master cylinder pressure or the wheel cylinder pressure is the same. For example, if the pad friction coefficient is small, with the same master cylinder pressure, the vehicle deceleration is small.

SUMMARY OF THE INVENTION

It is therefore an object of the present invention to provide a braking system for a vehicle which, when the performance of a booster has deteriorated and during heavy load driving, lightens the burden on the driver by lightening a brake pedal depressing force required to obtain a certain braking force and shortens braking distance by supplementing the braking state (deceleration) of the vehicle.

To achieve the above-mentioned object and other objects, a braking system for a vehicle according to the present invention comprises a brake pedal, a brake fluid pressure generating device for generating a first brake fluid pressure in correspondence with an amount of operation of the brake pedal, vehicle braking force generating devices for generating braking forces onto respective wheels of the vehicle, a determining device for determining whether a braking state of the vehicle corresponds to the state of operation of the brake pedal, and a controlling device for increasing a brake fluid pressure acting on the braking force generating devices when the determining device makes a negative determination.

Thus, when a vehicle braking force corresponding to the amount of operation of the brake pedal is not being produced, the first brake fluid pressure is increased and the vehicle braking force is thereby increased. As a result, in cases such as when the performance of a booster has deteriorated, during heavy load driving, and during downhill driving, in which it is not possible to obtain a sufficient vehicle braking force with the same brake pedal operating amount as during a normal braking operation, it becomes possible to obtain an ample vehicle braking force with the same brake pedal operating amount as during the normal braking operation. Therefore, it is possible to lighten the brake pedal depressing force required to obtain a sufficient braking force.

The above-mentioned controlling device may be a pressure amplifying device. That is, in the vehicle braking system described above, the controlling device may be the pressure amplifying device which disposed in a first conduit connecting the brake fluid pressure generating device to the braking force generating device, reduces by a predetermined amount a quantity of brake fluid generating the first brake fluid pressure in the first conduit, and moves this predetermined amount of brake fluid to a braking force generating device side.

In this way, the quantity of brake fluid in the first conduit generating the first brake fluid pressure is reduced by the predetermined amount and this reduction amount of brake fluid is used to increase the braking force at the braking force generating devices. That is, because in the first conduit the quantity of brake fluid is reduced by a predetermined amount, the brake fluid pressure in the first conduit connecting to the brake fluid pressure generating device decreases correspondingly and the pedal reacting force is lightened. Therefore, the burden on the driver in depressing the brake pedal can be lightened and depressing the brake pedal further becomes easy also.

This pressure amplifying device may be provided with a holding device for holding a differential pressure between a second brake fluid pressure in a second conduit, which connects to the braking force generating device side, and the first brake fluid pressure in the first conduit, for example by attenuating pressure of brake fluid flowing from the second conduit into the first conduit with a predetermined attenuating ratio. A proportioning control valve can be employed as such a holding device. When the proportioning control valve is used, it is possible to realize mechanical attenuation action of brake fluid pressure with a predetermined ratio when the brake fluid flows from the second conduit to the first conduit.

In a braking system for a vehicle having the pressure amplifying device provided with the holding device as described above, a brake fluid moving device which carries out brake fluid movement control may be further provided.

Also, a braking system for a vehicle according to the present invention may comprise; a brake pedal operated by a driver to apply a braking force to the vehicle, a brake fluid pressure generating device for generating a first brake fluid pressure in a brake fluid pressure generating source in correspondence with an amount of operation of the brake pedal, a booster for boosting the state of operation of the brake pedal by the driver using a gas pressure difference between a first pressure and a negative pressure when the first brake fluid pressure is generated in the brake fluid pressure generating source in correspondence with the amount of operation of the brake pedal, braking force generating devices connected to the brake fluid pressure generating source for generating wheel braking forces in wheels of the vehicle, a detecting device for detecting the value of the negative pressure in the booster, a functional state determining device for comparing the detection result of the detection device with a predetermined value and determining the functional state of the booster by determining whether or not the negative pressure is greater than the predetermined value, a braking state detecting device for detecting that the vehicle is in a braking state, a vehicle deceleration detecting device for detecting the deceleration of the vehicle, and an increasing device for increasing the wheel braking force in the braking force generating device until the vehicle deceleration reaches a predetermined vehicle deceleration irrespective of the state of operation of the brake pedal when the functional state determining device determines that the booster is nonfunctional and the detection result of the braking state detecting device is that the vehicle is in a state of braking.

In the braking system of the present invention, because when loss of function of the booster is detected the increasing device continuously increases the wheel braking force until a predetermined vehicle deceleration is obtained, it is possible to secure initial braking when the booster is defective. The increasing device may increase the wheel braking force so that a predetermined vehicle deceleration is obtained for example whenever the brake pedal is being depressed and stop lamps are therefore on and the booster is defective, irrespective of the magnitude of the first brake fluid pressure.

When the booster has deteriorated in performance or lost function and the increasing device is being operated, the increasing device may be stopped on the basis of the vehicle deceleration and a value related to the first brake fluid pressure corresponding to a master cylinder pressure, for example the rate of increase of the first brake fluid pressure. That is, the operation of the increasing device may be stopped when a vehicle deceleration greater than a deceleration corresponding to a preset rate of increase of the first brake fluid pressure has been obtained. At this time, even when the booster has deteriorated in performance or lost function, the wheel braking force changes in response to brake-pedal operation by the driver and it is possible to suppress excessive deceleration caused by the wheel braking force being increased too much and minimize any incongruous feeling experienced by the driver.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

First Preferred Embodiment

Figure 1:
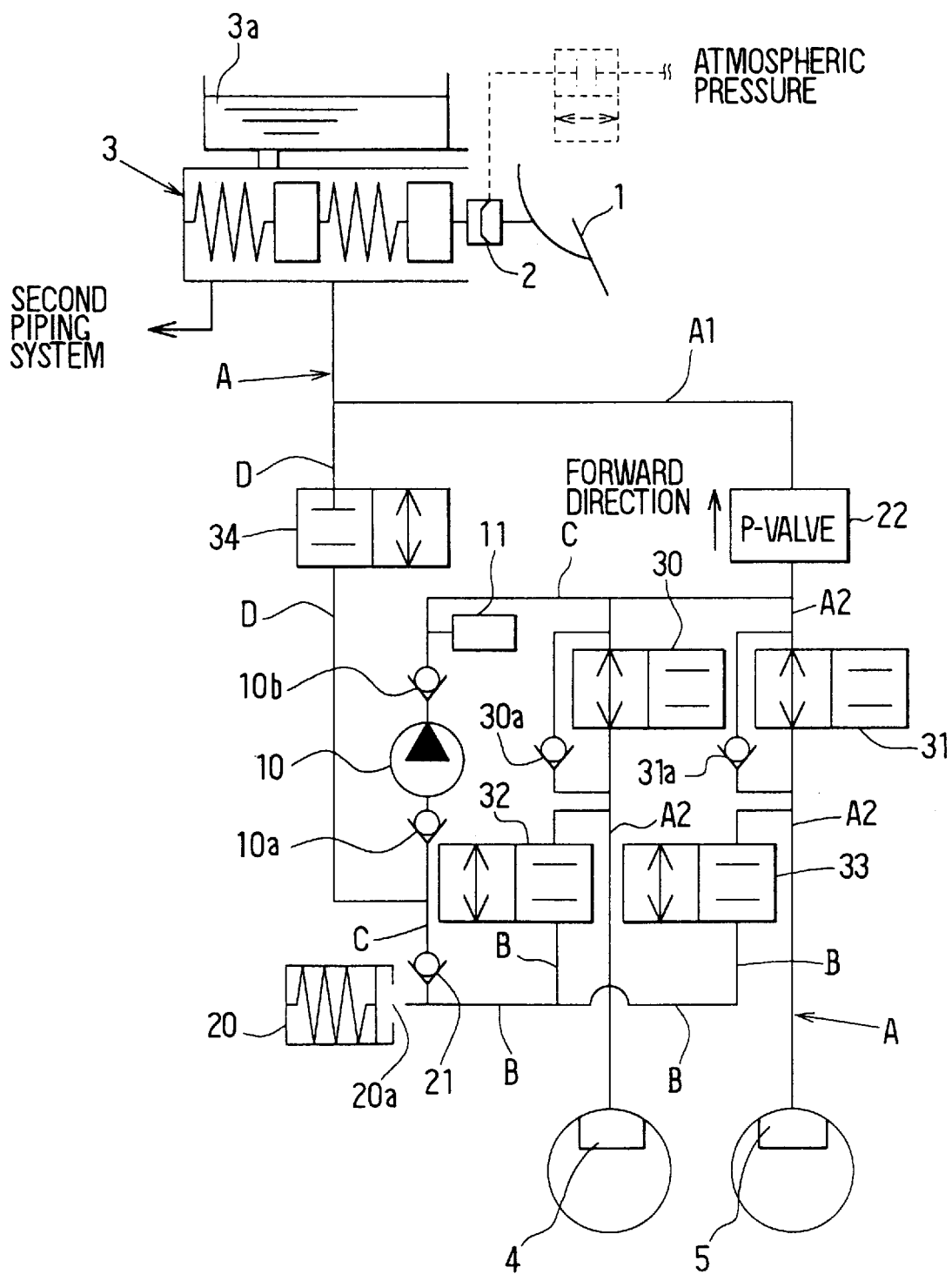
FIG. 1 is a schematic view of a vehicle braking system of a first preferred embodiment of the present invention.

The basic construction of a braking system will be described on the basis of FIG. 1. FIG. 1 is a schematic view of a brake piping arrangement in a first preferred embodiment of the present invention, and in this case, a braking system according to the present invention is applied to a front wheel drive, four-wheeled vehicle having a hydraulic circuit with an X-type piping arrangement having respective piping systems for the front right wheel and the rear left wheel and for the front left wheel and the rear right wheel will be described.

As shown in FIG. 1, a brake pedal 1 depressed by a driver to apply a braking force to the vehicle is connected to a booster 2 constituting a brake fluid pressure generating device, and the depressing force applied to the brake pedal 1 and the pedal stroke of the pedal 1 (the operating state) are transmitted to this booster 2. A pressure sensor (not shown) is provided on the pedal 1, and this pressure sensor detects the depressing force as the result that the driver has depressed the pedal 1.

The booster 2 has at least two chambers, a first chamber and a second chamber, and for example the first chamber is an atmospheric pressure chamber and the second chamber is a negative pressure chamber. For the negative pressure in this negative pressure chamber, for example, a negative pressure in an engine intake manifold or a negative pressure provided by a vacuum pump is used. The booster 2 directly boosts the pedal depressing force or the pedal stroke inputted by the driver by means of the pressure difference between the first chamber and the second chamber.

The booster 2 has a push rod or the like which transmits the depressing force or the pedal stroke thus boosted to a master cylinder 3, and this push rod generates a master cylinder pressure PU by pushing a master piston disposed in the master cylinder 3. This master cylinder 3 has its own master reservoir 3a for supplying brake fluid into the master cylinder 3 and storing excess brake fluid from the inside of the master cylinder 3.

The master cylinder pressure PU is transmitted by way of an anti-skid system to a first wheel cylinder 4 for the front right (FR) wheel and a second wheel cylinder 5 for the rear left (RL) wheel (wheel braking force generating devices). The following description refers to the front right (FR) and rear left (RL) side of the hydraulic circuit; since the front left (FL) and rear right (RR) side constituting the second piping system is exactly the same, it will not be described in the following.

The anti-skid system has the following construction. First, a conduit A is connected to the master cylinder 3, and a proportional control valve 22 is disposed in the conduit A. The conduit A is divided into two parts by this proportional control valve 22. That is, the conduit A is divided into a first conduit A1 receiving the master cylinder pressure PU and extending from the master cylinder 3 to the proportional control valve 22, and a second conduit A2 extending from the proportional control valve 22 to the wheel cylinders 4, 5.

This proportional control valve 22, normally, when brake fluid flows therethrough in a forward direction, has the action of transmitting a pressure of the brake fluid on an upstream side to its downstream side while attenuating the pressure of the brake fluid with a predetermined attenuating ratio. When the proportional control valve 22 is connected reversely, as shown in FIG. 1, if brake fluid is flowing through the proportional control valve 22 in the forward direction and the master cylinder pressure PU and the pressure on the wheel cylinders 4, 5 side both rise above a break-point pressure set in the proportional control valve 22, the second conduit A2 side becomes the above-mentioned upstream side and the brake fluid pressure in the second conduit A2 becomes higher than that in the first conduit A1.

In the second conduit A2, the conduit A2 branches into two, and a first pressure increase control valve 30 for controlling increase in the brake fluid pressure to the first wheel cylinder 4 is disposed in one of the branched conduits and second pressure increase control valve 31 for controlling increase in the brake fluid pressure to the second wheel cylinder 5 is disposed in the other branched conduit.

These first and second pressure increase control valves 30 and 31 are two-position valves capable of being controlled to open and close by an anti-skid system electronic control unit (ECU). When these two-position valves have been opened, the master cylinder pressure PU or a brake fluid pressure caused by the delivery of brake fluid due to a pump 10 can be applied to the wheel cylinders 4, 5.

In normal braking, during which anti-skid control is not carried out, the first and second pressure increase control valves 30, 31 are always open. Safety valves 30a, 31a are disposed in parallel with the first and second pressure increase control valves 30, 31 respectively and remove excessive brake fluid pressure from the wheel cylinders 4, 5 side.

A first pressure decrease control valve 32 and a second pressure decrease control valve 33, which are also two-position valves capable of being controlled to open and close by the anti-skid system ECU, are disposed in conduits B connecting the conduits A2 between the first and second pressure increase control valves 30, 31 and the wheel cylinders 4, 5 to a reservoir opening 20a of a reservoir 20. The first and second pressure decrease control valves 32, 33 are always closed during normal braking (i.e. when the anti-skid system is not operating).

A pump 10 is disposed between safety valves 10a, 10b in a conduit C connecting the conduit A2 between the proportional control valve 22 and the first and second pressure increase control valves 30, 31 to the reservoir opening 20a of the reservoir 20. To moderate pulsation of brake fluid delivered by the pump 10, an accumulator 11 is disposed in the conduit C on a delivery side of the pump 10.

A conduit D is disposed so as to connect the section of the conduit C between the reservoir 20 and the pump 10 to the master cylinder 3, and the pump 10 takes in brake fluid from the first conduit A1 through the conduit D and delivers it into the second conduit A2. By this means, for example, when the performance of the booster 2 has deteriorated or during heavy load driving, the brake fluid pressure to the wheel cylinders 4, 5 can be increased.

A control valve 34 is provided in the conduit D, and this control valve 34 is always closed during normal braking. This control valve 34 is provided to control the amount of fluid taken into the pump 10 and to prevent the brake fluid provided from the master cylinder 3 to the conduit A from flowing into the conduit D; however, alternatively this control valve 34 may be dispensed with.

A non-return valve 21 is disposed between the reservoir 20 and the connection point between the conduit C and conduit D so that brake fluid does not flow back from the conduit C into the reservoir 20 due to fluid pressure transmitted through the conduit D.

The states of the first and second pressure increase control valves 30, 31, the first and second pressure decrease control valves 32, 33 and the pump 10 are controlled by the anti-skid system ECU (not shown).

Braking control carried out by the above-mentioned anti-skid system ECU will now be described on the basis of the flow chart of FIG. 2. The processing of this braking control starts simultaneously when the driver depresses the brake pedal, and processing is executed as follows.

First, in step 100, ordinary state initialization processing such as clearing flags is carried out. Then, in step 110, on the basis of signals from wheel speed sensors provided to the wheels, the wheel speed Vw of the wheels is calculated.

Figure 5:
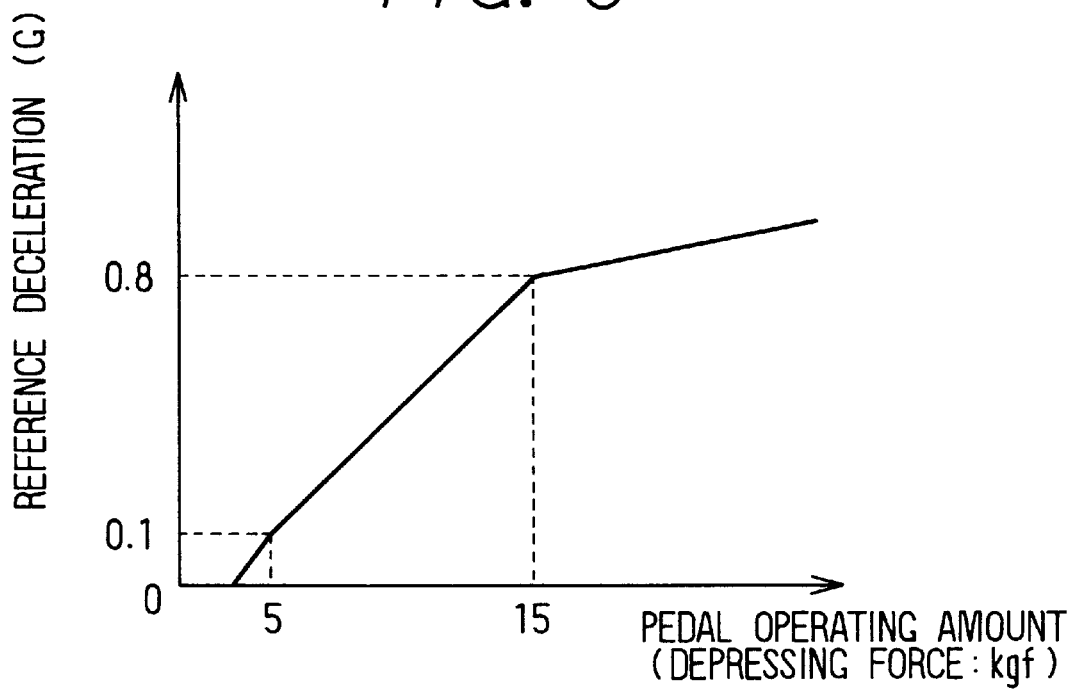
FIG. 5 is a correlation chart of reference deceleration to be targeted with respect to an operation amount of a brake pedal.

In step 120, a depressing force detected by the pressure sensor is inputted as a signal representing the operating state of the brake pedal. In step 130, a reference deceleration is calculated on the basis of this depressing force. This reference deceleration is calculated from a characteristic of deceleration expected on the basis of the pedal operating amount (pedal stroke or depressing force; in this example, depressing force), as shown in FIG. 5. Because this characteristic varies with the quality of the brake pads, etc., it can be set in any suitable way, and can for example be set according to the braking feel to be experienced by the driver. Also, the relationship between the depressing force and the resulting deceleration varies depending on the friction coefficient $\mu$ of the road surface, and should be set for example to suit high $\mu$ roads (asphalt roads and the like) the probability of the vehicle traveling on which is high.

In step 140, on the basis of the calculated wheel speed Vw, for example on the basis of an average wheel speed value for the four wheels, an actual deceleration is calculated. Alternatively, a so-called G sensor outputting the acceleration of the vehicle may be provided and this actual deceleration can be calculated on the basis of the acceleration detected by this G sensor.

In step 150 the difference between the reference deceleration and the actual deceleration is derived and then compared with a predetermined value K. If at this time, the reference deceleration − (minus) the actual deceleration > (is greater than) the predetermined value K, processing proceeds to step 160 and a pressure increase control processing is carried out. That is, this processing is carried out when a braking force corresponding to the pedal operating amount is not being obtained, and makes the actual deceleration approach the reference deceleration. If the reference deceleration − (minus) the actual deceleration ≦ (is equal to or less than) the predetermined value K, processing proceeds to step 170, pressure increase control is terminated, and processing ends.

Step 160 and step 170 respectively correspond to the flow charts of FIG. 3 and FIG. 4, and these flow charts will now be explained.

Figure 3:
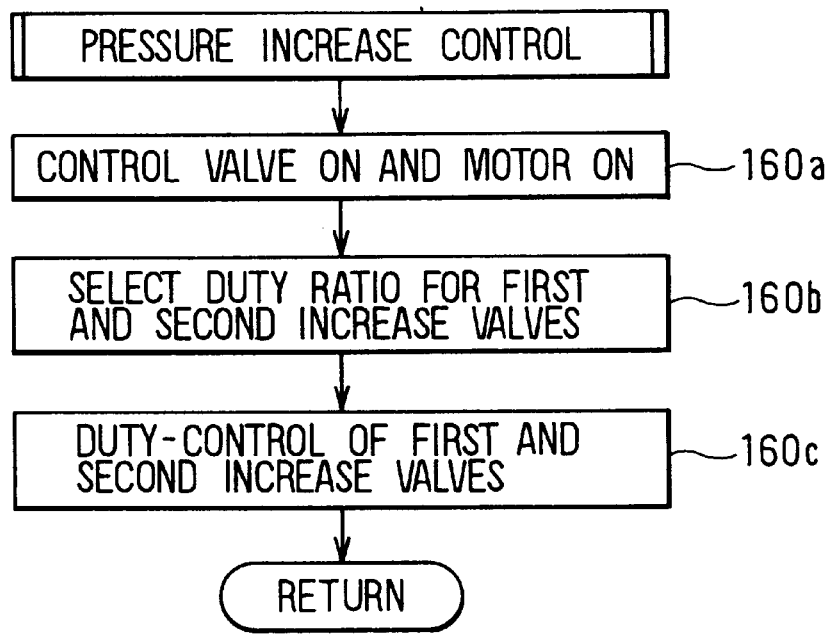
FIG. 3 is a flow chart of pressure increase control shown in FIG. 2.

FIG. 3 shows processing in pressure increase control of step 160. First, in step 160a, the control valve 34 is opened and at the same time a motor driving the pump 10 is switched on. As a result, the pump 10 delivers brake fluid taken in from the conduit D into the conduit A2 and thereby increases the brake fluid pressure in the wheel cylinders 4, 5.

Figure 6:
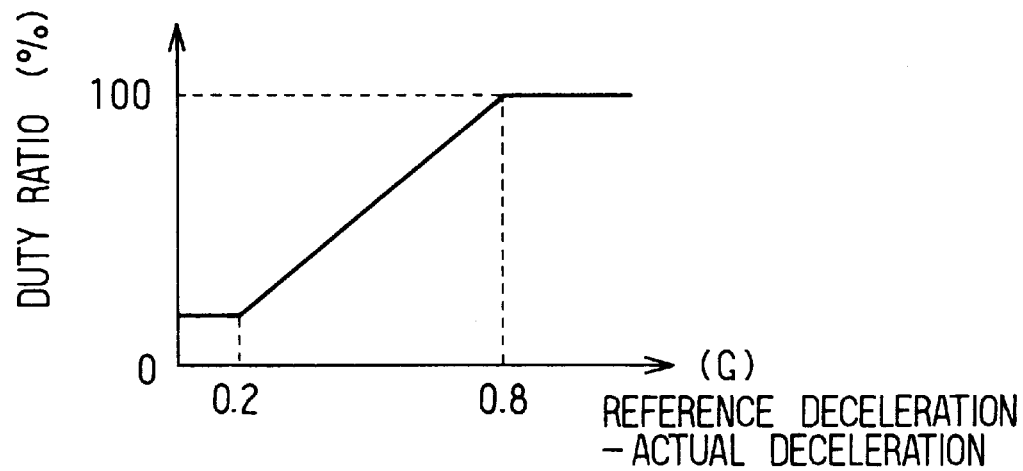
FIG. 6 is a correlation chart used in duty-controlling first and second pressure increase valves.

Then, in step 160b, selection from a map is carried out to duty-control the first and second pressure increase control valves 30, 31. As shown in FIG. 6, a duty ratio is selected from the map according to the magnitude of the difference between the reference deceleration and the actual deceleration derived in step 150 of FIG. 2. In other words, the greater the difference between the reference deceleration and the actual deceleration is the higher the duty ratio is, and for example a duty ratio of 100% shows that the control valve 34 is constantly open. After that, processing proceeds to step 160c, duty control of the first and second pressure increase control valves 30, 31 is carried out, and then processing ends. As a result, the actual deceleration approaches the reference deceleration.

Figure 4:
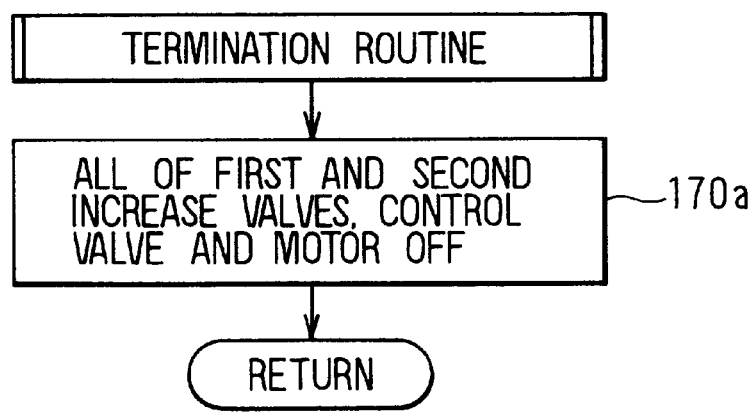
FIG. 4 is a flow chart of processing at a time of control termination shown in FIG. 2.

The processing of step 170 is shown in FIG. 4. When step 170 has been reached and pressure increase control is to be terminated, in step 170a the first and second pressure increase control valves 30, 31, the control valve 34 and the motor are all switched off and processing is ended.

That is, when a braking force corresponding to the pedal operating amount is not being obtained, the pump 10 is driven. As a result, the brake fluid pressure in the wheel cylinders 4, 5 is increased by way of duty control of the first and second pressure increase control valves 30, 31 and therefore, a braking force corresponding to the pedal operating amount is obtained.

Figure 7:
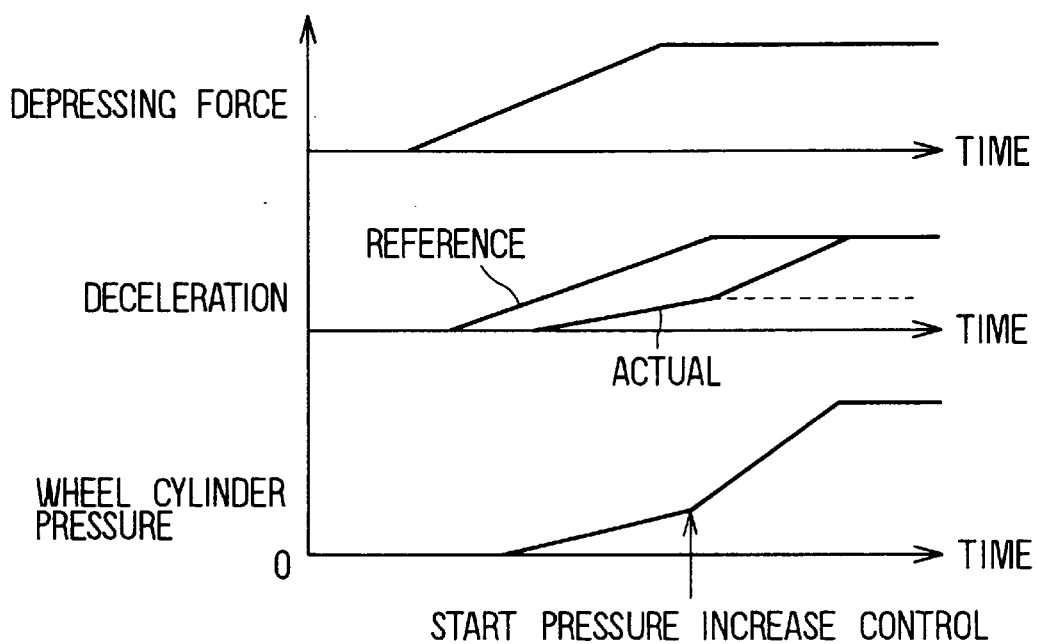
FIG. 7 is a time chart of a brake pedal stroke, vehicle speed and wheel cylinder pressure during pressure increase control.

An example of a time chart with respect to the depressing force, the vehicle speed and the wheel cylinder pressure during this pressure increase control is shown in FIG. 7. Here, the reference deceleration for a given depressing force (operating amount) is set as shown in FIG. 5. When the wheel cylinder pressure is increased by pressure increase control, the actual deceleration increases so as to approach the reference deceleration. When the difference between the actual deceleration and the reference deceleration has become zero, i.e. the braking force corresponding to the pedal operating amount has been obtained, the control is terminated.

As a result it is always possible to obtain a deceleration corresponding to the depressing force. Therefore, the brake depressing force needed to obtain a certain braking force when the performance of the booster 2 has deteriorated or during heavy load driving can be lightened and it is possible to lighten the burden on the driver and shorten braking distances.

In this preferred embodiment, the depressing force detected by the pressure sensor is used as the operating amount of the brake pedal, but instead of this, a pedal movement distance detected by a stroke sensor may be used. Also, although in this preferred embodiment pressure increase control is carried out on the basis of the vehicle deceleration, pressure increase control may alternatively be carried out on the basis of the wheel deceleration.

Second Preferred Embodiment

The basic construction of a braking system in a second preferred embodiment of the invention is the same as that shown in FIG. 1.

Figure 8:
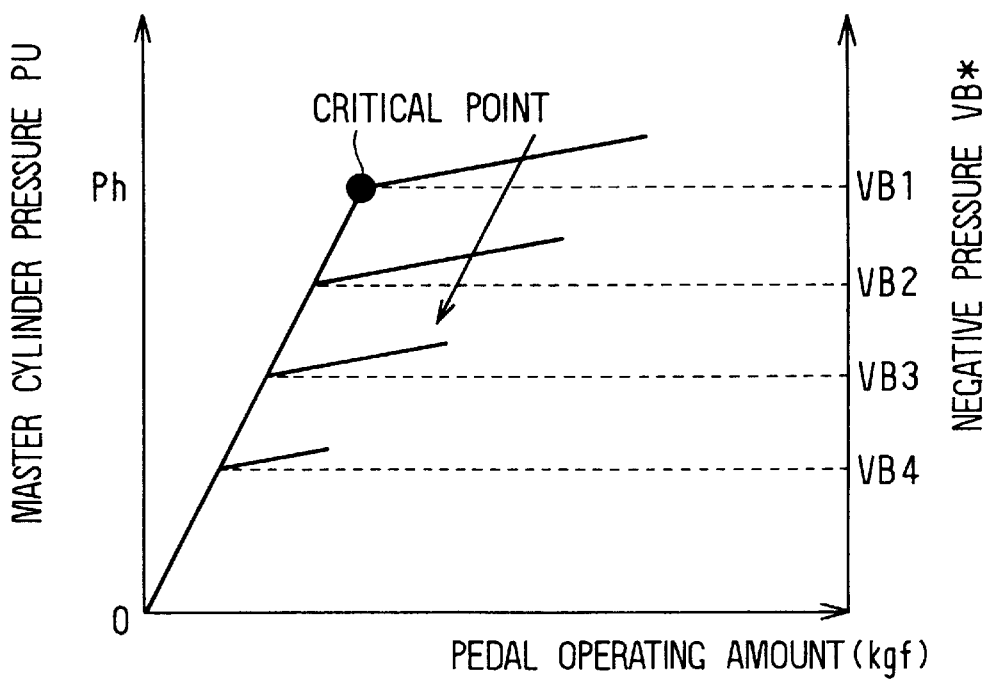
FIG. 8 is a correlation chart of a master cylinder pressure PU with respect to a pedal operating amount.

A correlation chart of pedal operating amount and master cylinder pressure PU is shown in FIG. 8. As shown in FIG. 8, the relationship between the pedal operating amount and the master cylinder pressure PU is such that until the pedal operating amount reaches a certain value the master cylinder pressure PU increases at a predetermined rate. This is because the depressing force is boosted by the booster 2 and the boosted depressing force is reflected in the master cylinder pressure PU.

However, when the pedal operating amount is increased to the critical point (assist limit point) shown in FIG. 8, the limit of the capability of the booster 2 is reached and thereafter the master cylinder pressure PU is in a substantially one-to-one proportional relationship with the pedal operating amount. Accordingly, because there is this kind of relationship, in this second preferred embodiment pressure increase control is executed with the master cylinder pressure PU as the operating amount.

This critical point is related to the performance of the booster 2, and falls as shown by the arrow in FIG. 8 along with deterioration of the performance of the booster 2. The pressure at this critical point (hereinafter referred to as the critical point pressure) Ph can be found from the negative pressure VB* (VB1>VB2>VB3>VB4) of the booster 2. The pressure Ph can also be found from the relationship between the negative pressure and the master cylinder pressure PU or the pedal operating amount and the master cylinder pressure PU. The critical point pressure Ph corresponding to the negative pressure value VB1 depends on the capability limit of the booster 2 and is called the static critical point pressure.

Figure 9:
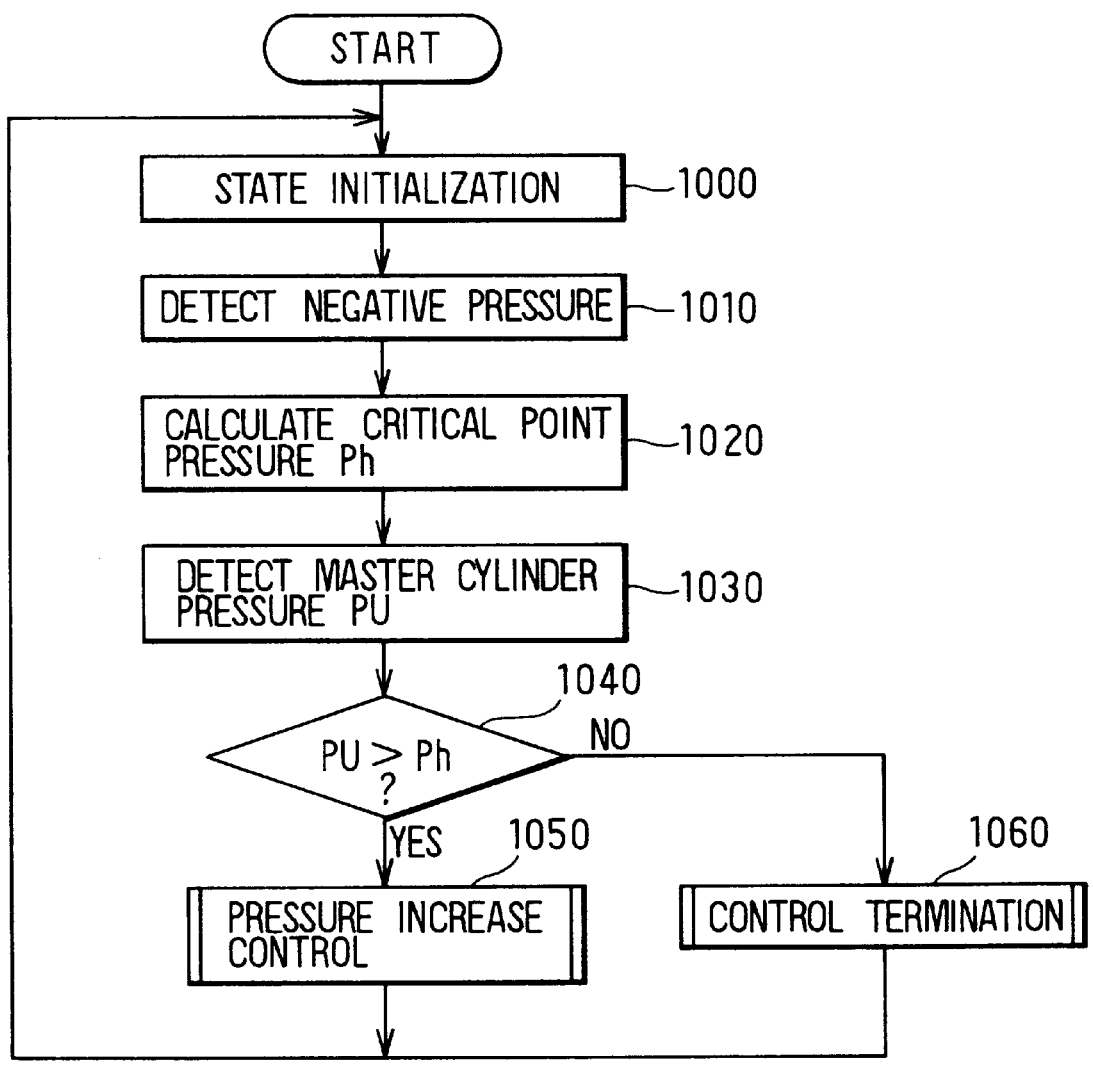
FIG. 9 is a flow chart of processing carried out by an ECU in a second preferred embodiment.

Next, braking control carried out by the anti-skid system ECU in this preferred embodiment will be described with reference to the flow chart of FIG. 9.

Figure 2:
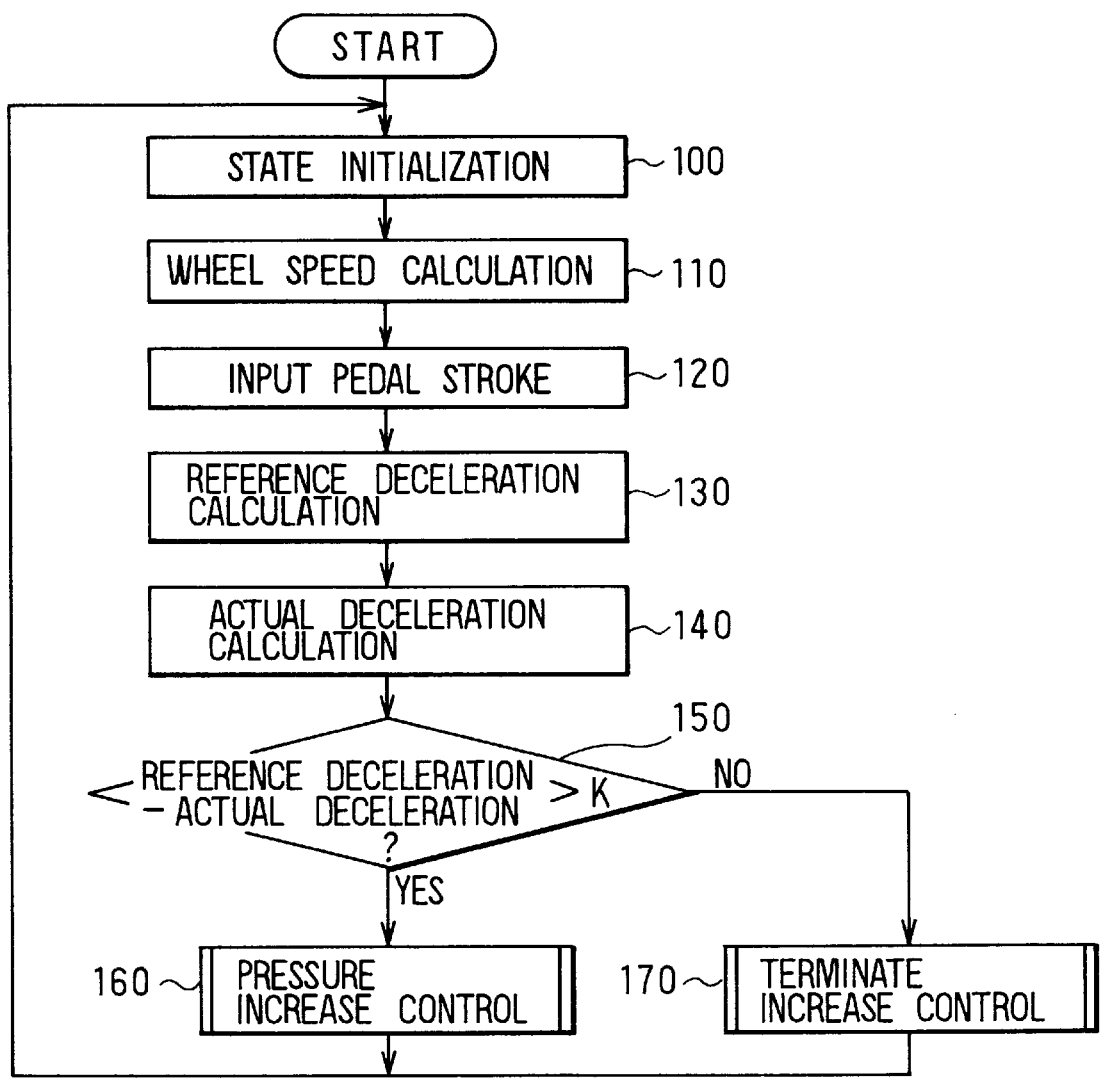
FIG. 2 is a flow chart of processing carried out by an ECU in FIG. 1.

First, in step 1000, state initialization is carried out by processing similar to that of step 100 in FIG. 2. Then, in step 1010, the negative pressure in the second chamber side of the booster 2 is detected by a negative pressure sensor. In step 1020, the critical point pressure Ph is calculated on the basis of the negative pressure detected in step 1010.

Then, in step 1030, the master cylinder pressure PU of the master cylinder 3 is detected by a fluid pressure sensor. Here, the master cylinder pressure PU corresponds to an operation amount of the brake pedal. That is, the master cylinder pressure PU and the pedal operating amount satisfy the relationship shown in FIG. 8. Accordingly, in this preferred embodiment the master cylinder pressure PU is used as an operating amount corresponding to the pedal operating amount and it is determined whether or not a braking force corresponding to this operating amount is being obtained.

In step 1040, the critical point pressure Ph calculated in step 1030 and the master cylinder pressure PU are compared. When the master cylinder pressure PU> (is greater than) the critical point pressure Ph, i.e. when assisting by the booster 2 has reached the limit, processing proceeds to step 1050 and pressure increase control processing is executed. If the master cylinder pressure PU< (is less than) the critical point pressure Ph, processing proceeds to step 1060, control is terminated and processing ends.

The flow charts of the pressure increase control and the control termination are the same as those of FIG. 3 and FIG. 4 of the first preferred embodiment and therefore will not be shown here.

As a result, the same effects as those of the first preferred embodiment are obtained. The negative pressure value falling to VB2→VB3→VB4 occurs as a result of the variable pressure chamber (negative pressure chamber) of the booster 2 being pushed in by depression of the pedal and its volume decreasing. Along with this change in the negative pressure value, the critical point pressure Ph also falls; this is called the dynamic critical point pressure. In this preferred embodiment, because the dynamic variation in the negative pressure of the booster 2 is used as a parameter, pressure increase control can be executed to increase the wheel cylinder pressure, following the assisting performance deterioration of the booster 2 which accompanies falling of this dynamic critical point pressure.

When the performance of the booster 2 falls while the brake pedal is being depressed, boosting (assisting) of the brake depressing force in the booster 2 sometimes lags. This assist lag can be compensated for on the basis of the negative pressure detected in step 1010.

As mentioned above, the boosting action of the booster 2 is realized using a differential pressure between a second chamber always at a negative pressure and a first chamber into which atmospheric pressure is introduced in correspondence with pedal depression. Therefore, if the introduction of atmospheric pressure into the first chamber lags, the assisting performance of the booster 2 falls. Because this is a phenomenon which occurs together with variation in the negative pressure of the second chamber, if along with the decrease in the negative pressure the introduction of atmospheric air into the first chamber is promoted, assisting responsiveness and assisting performance can be improved.

Specifically, a conduit guiding atmospheric pressure into the first chamber on the pedal side of the booster 2 is additionally provided and a two-position valve opening and closing this conduit is provided in the conduit, as shown with broken lines in FIG. 1. By this two-position valve being suitably opened along with negative pressure decrease, lag in the introduction of atmospheric pressure into the first chamber can be reduced and the performance of the booster 2 can be improved.

Also, along with decrease in the negative pressure, reversely, the negative pressure introduced into the second chamber may be promoted. In this case, a conduit guiding a negative pressure to the second chamber may be additionally formed and a two-position valve provided in this conduit. In this way, the same effects can also be obtained.

This kind of control in the booster 2 may be carried out in addition to pressure increase control executed by the pump 10 and the proportional control valve 22, or just control in the booster 2 may be carried out singly.

Third Preferred Embodiment

The basic construction of a braking system in a third preferred embodiment of the invention is the same as that shown in FIG. 1.

Figure 10:
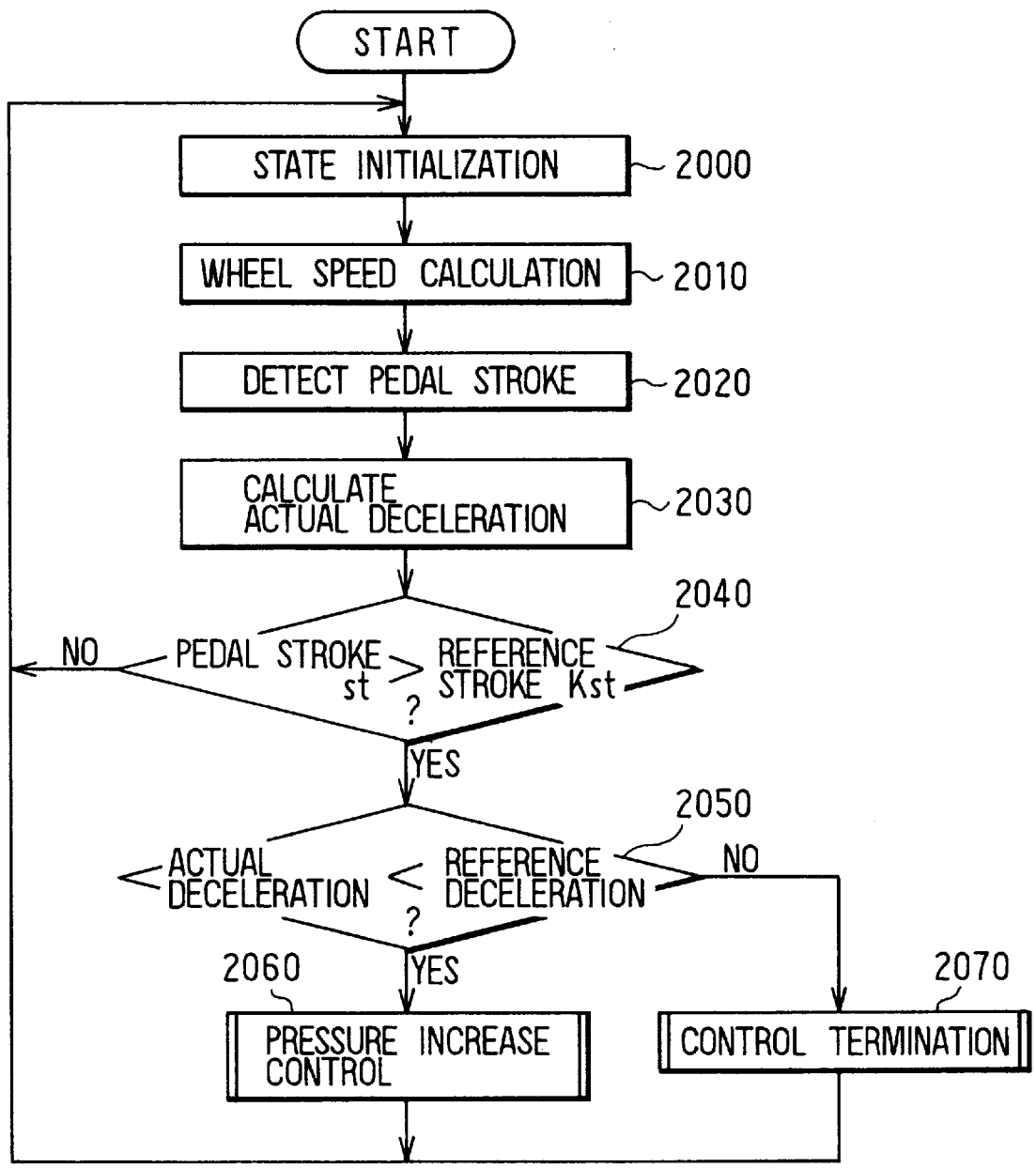
FIG. 10 is a flow chart of processing carried out by an ECU in a third preferred embodiment.

Braking control carried out by the anti-skid system ECU in this preferred embodiment will be described with reference to the flow chart of FIG. 10.

First, in steps 2000 and 2010, state initialization and input of wheel speed signals are carried out by processing similar to that of steps 100, 110 of FIG. 2. In step 2020, a pedal stroke st is detected by a stroke sensor (not shown) and inputted. In step 2030, an actual deceleration is calculated by the same method as in step 140 of FIG. 2.

Next, in step 2040, the pedal stroke st and a reference stroke kst prestored in a ROM are compared. This reference stroke kst is arbitrarily determined, and for example may be made 5 cm, whereby a value with which a considerably large braking force is considered to be required is made the reference. If the pedal stroke st> (is greater than) the reference stroke kst, processing proceeds to step 2050. If the stroke st< (is less than) the reference stroke kst, processing returns to step 2000.

In step 2050 the previously calculated actual deceleration and a reference deceleration are compared. This reference deceleration is determined in correspondence with the reference stroke kst, and is the deceleration considered necessary when the pedal operating amount is the same as the reference stroke kst. If the actual deceleration< (is less than) the reference deceleration processing proceeds to step 2060 and pressure increase control is carried out. If the actual deceleration> (is greater than ) the reference, deceleration processing proceeds to step 2070 and pressure increase control is terminated.

The relationship between the actual deceleration and the reference deceleration is preferably set for a high $\mu$ road (asphalt or the like), the probability of the vehicle traveling on which is high. Middle and low $\mu$ roads may be detected and pressure increase control prohibited when appropriate.

The flow charts of the pressure increase control and the control termination are the same as the processing of FIG. 3 and FIG. 4 of the first preferred embodiment and therefore will not be shown here.

In this way it is also possible to execute pressure increase control when a pedal stroke st has reached a reference stroke kst.

Fourth Preferred Embodiment

Figure 11:
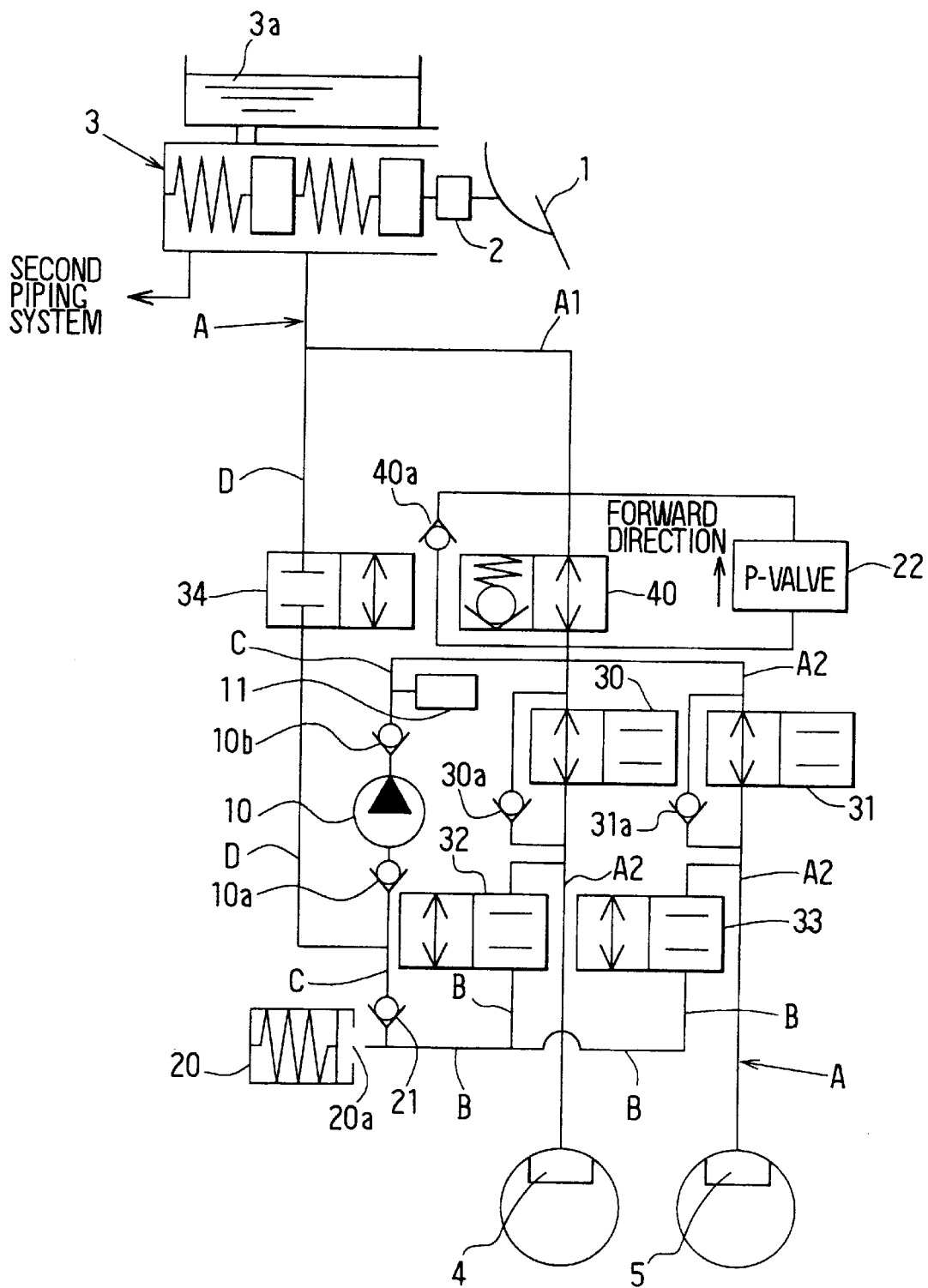
FIG. 11 is a schematic view of a vehicle braking system of a fourth preferred embodiment.

FIG. 11 is a view showing the basic construction of a braking system in a fourth preferred embodiment of the present invention. The construction of this braking system is similar to the construction of the braking system shown in FIG. 1, and therefore only the points of difference will be discussed here. Parts similar to parts shown in FIG. 1 are shown with the same reference numerals as in FIG. 1. Also, braking control carried out by the anti-skid system ECU in this preferred embodiment is the same as the flow charts of FIG. 2 through FIG. 4 in the first preferred embodiment.

As shown in FIG. 11, in this fourth preferred embodiment a two-position valve 40 having a differential pressure regulating valve is disposed in parallel with the proportioning control valve 22. This two-position valve 40 is always open during normal braking. A non-return valve 40a is disposed in parallel with the two-position valve 40.

During pressure increase control, the two-position valve 40 is switched to a position of the differential pressure regulating valve. Therefore the conduit A1 is kept closed until a predetermined differential pressure arises between the conduit on the master cylinder 3 side of the proportioning control valve 22 and the two-position valve 40 and the conduit on the wheel cylinders 4, 5 side. For example, the differential pressure regulating valve may be made to open at a differential pressure of 110 atmospheres.

The conduit A is divided into the conduit A1 receiving the master cylinder pressure PU and the conduit A2 on the wheel cylinders 4, 5 side. Due to the proportioning control valve 22, the fluid pressure in the conduit A2 rises, and in this case the fluid pressure sometimes rises too much. At this time, so that the pressure does not become high enough to cause problems with respect to the durability of the conduit A2, when a differential pressure of more than 110 atmospheres arises the two-position valve 40 is opened through the differential pressure regulating valve and brake fluid is allowed to escape into the conduit A1 on the master cylinder 3 side.

Therefore, it is possible to carry out pressure increase control suitably without damaging the conduit A even when the fluid pressure in the conduit A2 has become very high.

Fifth Preferred Embodiment

Figure 12:
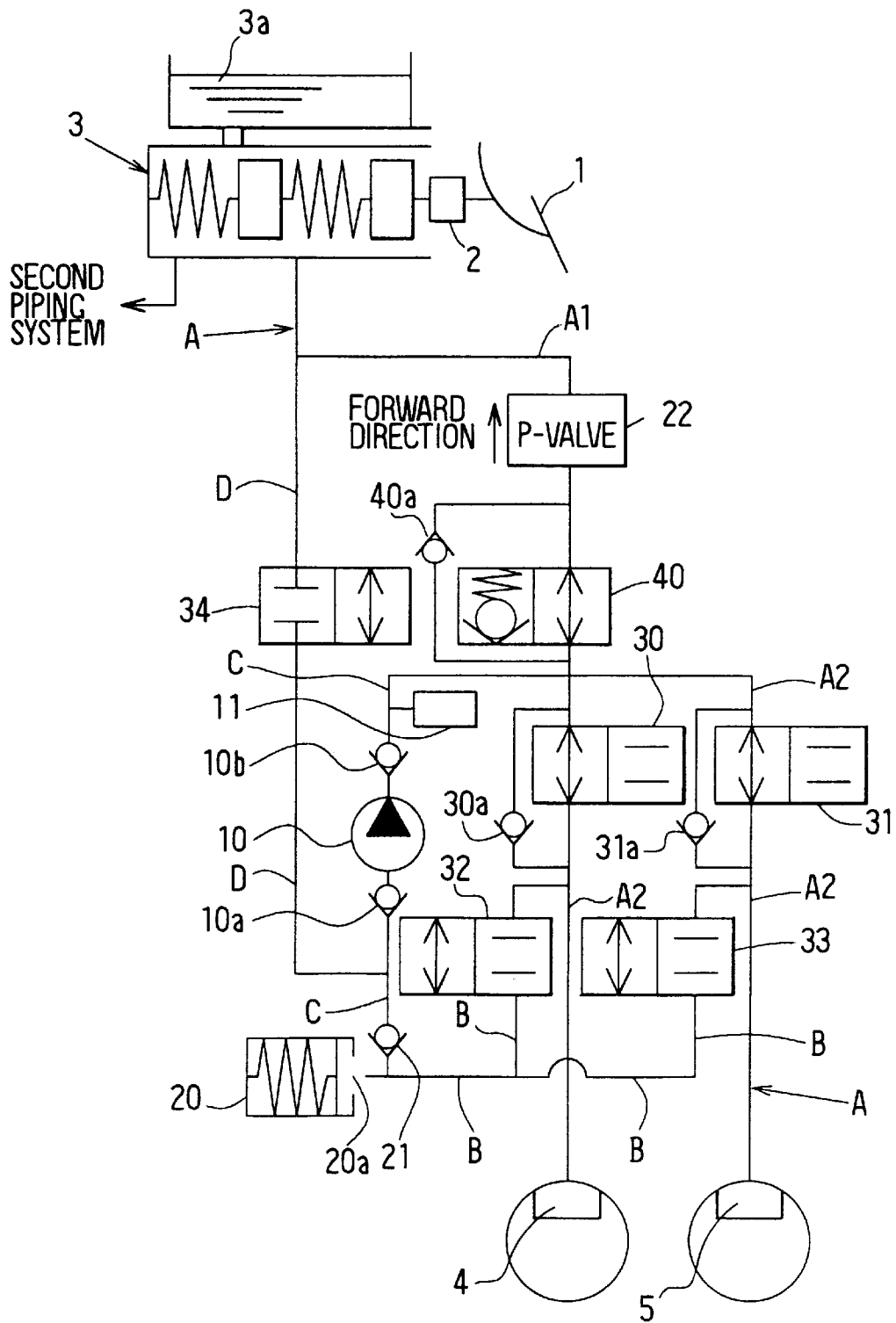
FIG. 12 is a schematic view of a vehicle braking system of a fifth preferred embodiment.

FIG. 12 is a view showing the basic construction of a braking system in a fifth preferred embodiment of the invention. The construction of this braking system is similar to the construction of the braking system shown in FIG. 1, and therefore only the points of difference will be discussed here. Parts similar to parts shown in FIG. 1 are shown with the same reference numerals as in FIG. 1. Also, braking control carried out by the anti-skid system ECU in this preferred embodiment is the same as the flow charts of FIG. 2 through FIG. 4 in the first preferred embodiment.

As shown in FIG. 12, in this fifth preferred embodiment a two-position valve 40 having a differential pressure regulating valve is disposed in the conduit A between the proportioning control valve 22 and the first and second pressure increase control valves 30, 31.

By providing the two-position valve 40 in this position, when the two-position valve 40 is set to its differential pressure regulating valve position, even if there is no pressure in the master cylinder 3 a pressure difference (for example 110 atmospheres) can be provided between the master cylinder 3 side and the wheel cylinders 4, 5 side. By adopting this kind of construction, for example vehicle control such as traction control and trace control or the like can be carried out by opening the control valve 34 and taking in brake fluid from the master cylinder 3 and delivering it to the wheel cylinders 4, 5 with the pump 10.

Sixth Preferred Embodiment

As shown in the second preferred embodiment, from when the master cylinder pressure PU reaches the dying point pressure Ph, because no boosting action of the brake depressing force by the booster is effected, a sufficient master cylinder pressure cannot be generated and consequently a sufficient wheel cylinder pressure cannot be generated.

Figure 13:
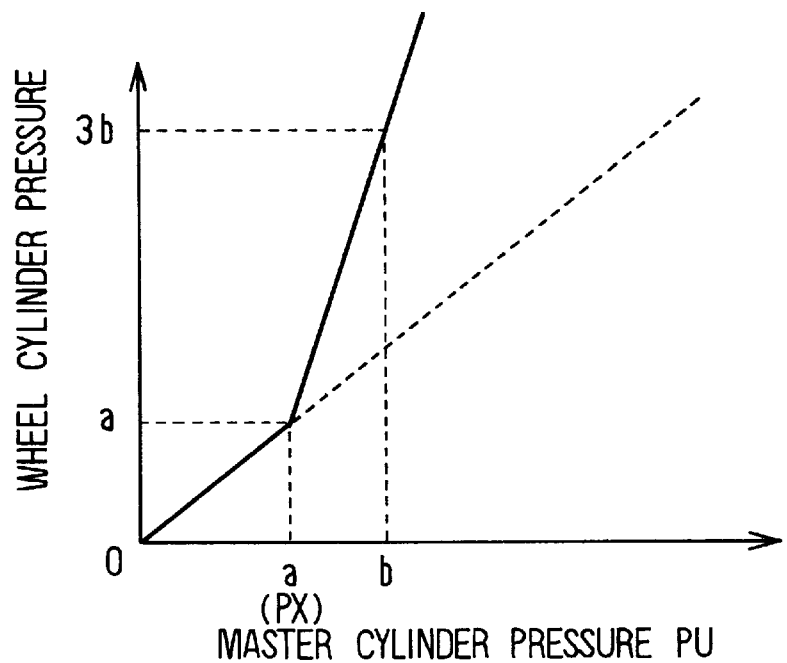
FIG. 13 is a graph illustrating a relationship between wheel cylinder pressure and master cylinder pressure PU.

Now, in the above-mentioned proportioning control valve 22, a break-point pressure Px at which attenuated flow from the wheel cylinders 4, 5 side to the master cylinder 3 side begins is set according to the stress of a spring disposed inside this proportional control valve 22. This characteristics of the master cylinder pressure PU and the wheel cylinder pressure is shown in FIG. 13. As shown in FIG. 13, until the master cylinder pressure PU reaches the predetermined break-point pressure Px the rate of increase in the wheel cylinder pressure with respect to increase in the master cylinder pressure PU is one to one. When the master cylinder pressure PU reaches the predetermined break-point pressure Px, in correspondence with the surface area ratio in a piston inside the proportioning control valve 22, the wheel cylinder pressure increase ratio becomes for example three to one with respect to the master cylinder pressure PU. This ratio can be changed by setting of the surface area ratio.

In other words, when the master cylinder pressure PU reaches the break-point pressure Px, attenuated transmission of the wheel cylinder pressure to the master cylinder 3 side is allowed by the proportioning control valve 22 and an action of holding the wheel cylinder pressure raised by the pump being driven is provided.

In view of this, by this break-point pressure Px being set to the critical point pressure Ph, assisting provided by the proportioning control valve 22 may be made to start when there ceases to be boosting of the brake depressing force by the booster 2. Because the critical point pressure Ph varies according to the state of the booster, as shown in FIG. 8, for example the critical point pressure Ph corresponding to the minimum negative pressure value VB4 conceivable from the performance of the booster 2 is selected and the break-point pressure Px is set to this. As a result, the wheel cylinder pressure can be increased even during the performance deterioration of the booster 2.

Until the holding action of the proportioning control valve 22 is effected, because the master cylinder pressure PU and the wheel cylinder pressure are equal even if the pump 10 is driven, driving the pump is useless. Therefore, the driving of the pump 10 is started when the master cylinder pressure PU reaches the break-point pressure Px.

Then, by driving the pump 10 the wheel cylinder pressure is increased until it reaches the relief pressure of the proportional control valve 22. At this time, the wheel cylinder pressure is increased by the driving of the pump 10 even when for example the driver holds the brake pedal without depressing it further, but due to the relieving action of the attenuated flow through the proportional control valve 22 the wheel cylinder pressure does not rise suddenly and the driver is not disconcerted.

In the setting of the break-point pressure it is also possible to select the pressure of when the booster 2 has ceased to function, i.e., the pressure of when the critical point pressure Ph has fallen the most. By this setting, assisting by the proportioning control valve 22 can be made possible even in a case of the booster 2 having ceased to function mechanically due to a breakdown.

Seventh Preferred Embodiment

In the sixth preferred embodiment the critical point pressure Ph at a single point was selected and the break-point pressure Px was set to that particular critical point pressure Ph. However, as mentioned above, the critical point pressure Ph varies with performance deterioration of the booster 2. In view of this, in this seventh preferred embodiment, the break-point pressure Px is varied to match the variation in the critical point pressure Ph.

That is, by using a valve wherein the break-point pressure Px can be varied by creating an electromagnetic force opposing the spring stress inside the valve as the proportioning control valve 22, setting of a break-point pressure Px matched to variation in the critical point pressure Ph is realized.

Specifically, the current critical point pressure Ph is calculated on the basis of a negative pressure detected by a negative pressure sensor as shown in the second preferred embodiment and the break-point pressure Px is changed to match the calculated critical point pressure Ph. For example, as a initial setting value, the break-point pressure may be set to the static critical point pressure corresponding to the negative pressure value VB1 in FIG. 8, and then the break-point pressure of the proportioning control valve 22 may be lowered in correspondence with a critical point pressure Ph based on a value detected by a negative pressure sensor.

Also, the pressure at which assisting is started and the rate of assisting (assist ratio) may be made variable. That is, instead of a reversely connected proportioning control valve, a linear control valve may be used to effect assisting.

As a result, wheel cylinder pressure increase assisting can be provided to compensate for performance deterioration and loss of function of the booster 2.

Other Preferred Embodiments

[1] Although in the fourth preferred embodiment described above pressure increase control was carried out by the same processing as in the first preferred embodiment, alternatively pressure increase control may be carried out by the same processing as in the second and third preferred embodiments.

Also, in the first through third preferred embodiments, to prevent the fluid pressure in the conduit A2 from becoming excessive as a result of pressure increase control and prevent damage to the conduit A2, a two-position valve having a differential pressure regulating valve may be disposed in parallel with the proportioning control valve 22.

Also, although as shown in FIG. 1 a proportioning control valve 22 was used to carry out pressure increase control, alternatively this proportional control valve 22 may be dispensed with and just a two-position valve may be used instead. In this case, in place of the control valve 34 this two-position valve may be duty-controlled.

Figure 14:
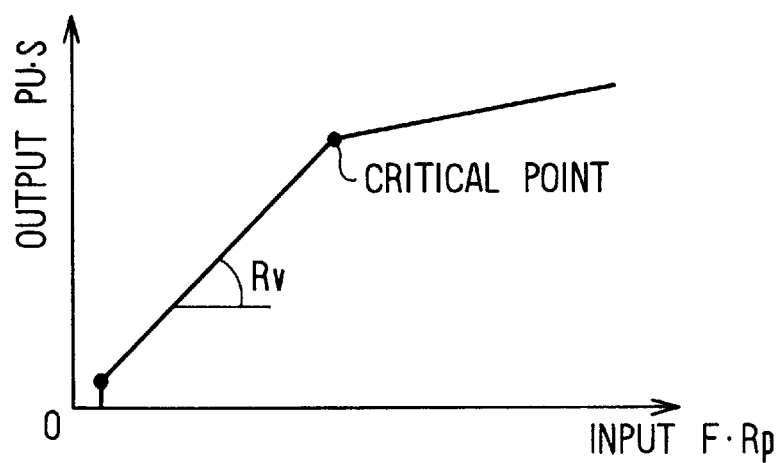
FIG. 14 is a characteristic chart showing a correlation between an input F.Rp and an output PU.S.

[2] The brake pedal operating force (depressing force) exerted by the driver may be found from an assist chart of the booster 2 of the kind shown in FIG. 14, and the amount of increase in the wheel cylinder pressure provided by pressure increase control may be determined according to this operating force.

That is, if the depressing force is written F and the pedal ratio is written Rp, a force of F.Rp acts on the input shaft of the booster 2 as an input action. If he assist ratio of the booster 2 is written by Rv, a force of F.Rp.Rv acts on the output shaft of the booster 2. If the effective surface area of the piston of the master cylinder 3 is written S, the output shaft force of the booster 2 is the product of the master cylinder pressure PU and the effective surface area of the piston, or PU.S. From these relationships, it is possible to calculate the input F.Rp from the output (shaft force) PU.S on the assist chart shown in FIG. 14, and then obtain F.

The pedal ratio Rp is a substantially fixed value, and the assist chart itself is fixed by the set performance of the booster 2. Using the depressing force F calculated in this way, for example if a depressing force F exceeding the critical point of the booster 2 when the booster 2 is functioning normally is exerted by the driver, a pressure increase corresponding to the depressing force F' of this difference may be made to act on the wheel cylinders 4, 5 by pressure increase control.

Figure 15:
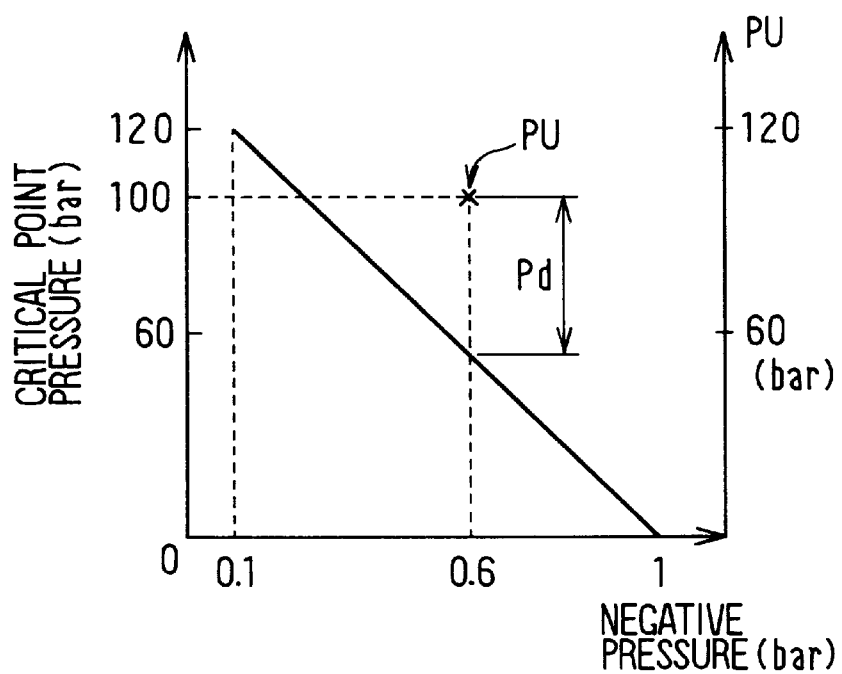
FIG. 15 is a characteristic chart showing a correlation between negative pressure and dying point pressure Ph and master cylinder pressure PU.
Figure 16:
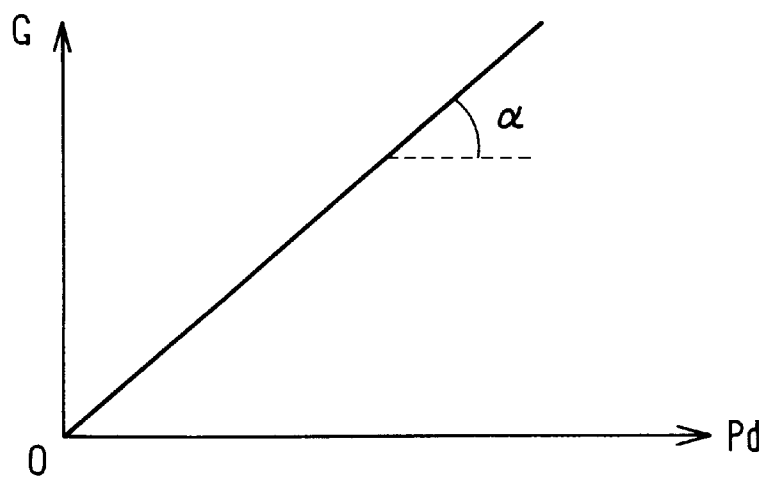
FIG. 16 is a correlation chart showing a relationship between the vehicle deceleration G and the present difference Pd between the master cylinder pressure PU and the dying point pressure Ph.

[3] At times of performance deterioration of the booster 2 due to negative pressure decrease, pressure increase control may be executed using the maps shown in FIG. 15 and FIG. 16. For example, it will be supposed that the negative pressure of the booster 2 is currently 0.6 bar and that its critical point pressure has fallen to 60 bar. If the master cylinder pressure PU at this time is 100 bar, a master cylinder pressure higher than the critical point pressure has now been reached. In this case, pressure increase control may be executed so that the difference Pd=40 bar (the present difference between the master cylinder pressure PU and the critical point pressure Ph) between PU=100 bar and the master cylinder pressure=60 bar at which the critical point pressure is reached makes the gradient $\alpha$ (normally $\alpha$ is set to about 15 G/bar) shown in FIG. 16.

Using the characteristic shown in FIG. 15, specifically, increase of the wheel cylinder pressure may be controlled in the following way. That is, when the negative pressure has fallen and a master cylinder pressure PU exceeding the critical point pressure has arisen, increasing of the wheel cylinder pressure by pressure increase control is continued until a vehicle deceleration G proportional to [master cylinder pressure PU–critical point pressure Ph] is reached.

At this time, the pressure increase is conducted for example on the basis of Exp. 1:

$$(PU\text{–critical pt. press. } Ph)/\alpha = G/1 \qquad \text{Exp. 1}$$

The characteristic chart of FIG. 15 yields Exp. 2:

$$Ph = (120/0.9) \times (1-\text{negative press.}) \qquad \text{Exp. 2}$$

The above Exp. 1 and Exp. 2 yield Exp. 3, and increasing of the wheel cylinder pressure may be carried out according to this Exp. 3:

$$G = [PU - \{(120/0.9) \times (1-\text{negative press.})\}]/\alpha \qquad \text{Exp. 3}$$

Figure 17:
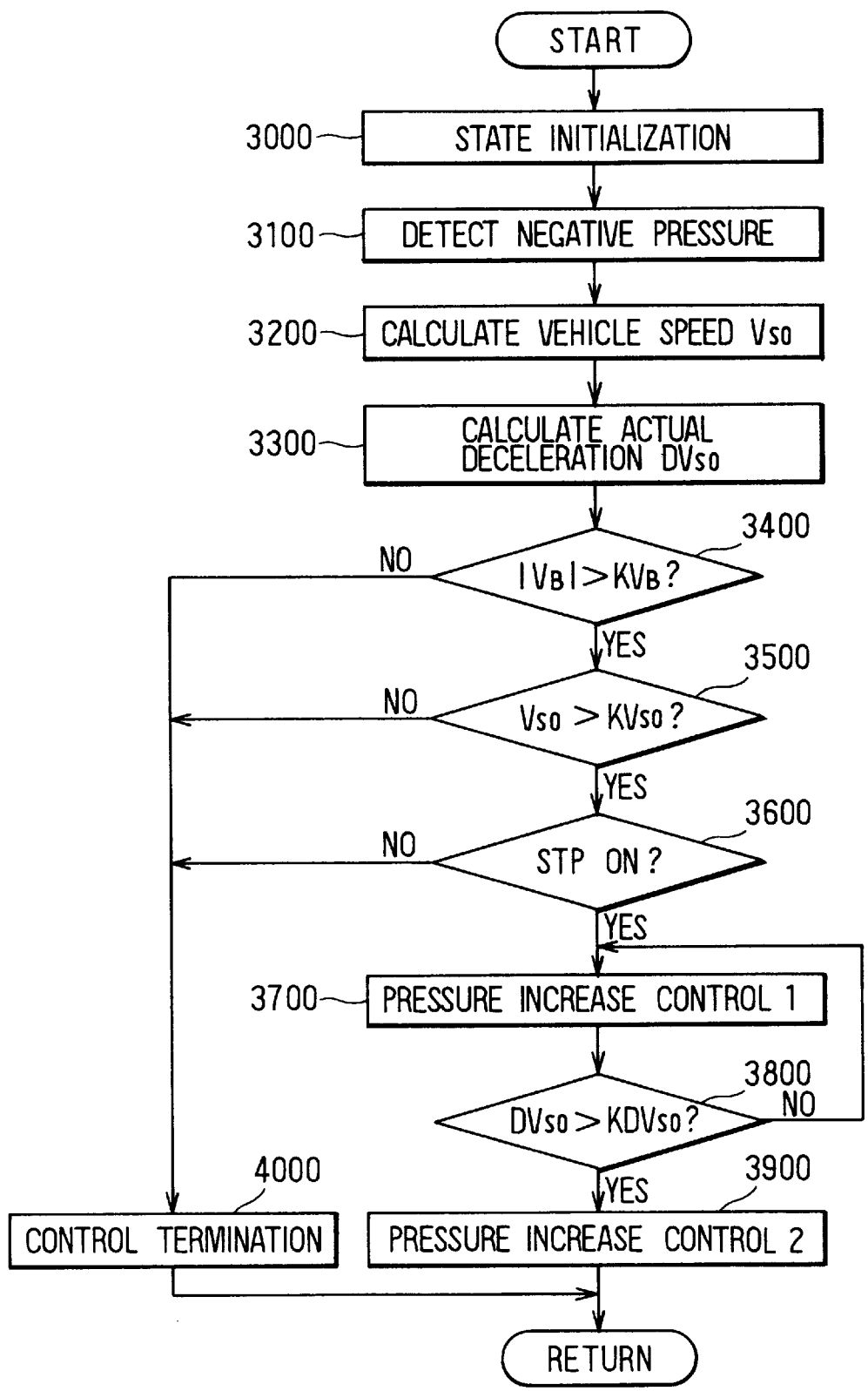
FIG. 17 is a flow chart of processing in another preferred embodiment.

[4] As pressure increase control of when the booster is nonfunctional, control following the flow chart of FIG. 17 may be executed.

This flow chart will now be explained briefly. In step 3000, state initialization is carried cut, and in step 3100 the negative pressure value VB of the negative pressure chamber of the booster 2 is inputted from a sensor. In step 3200 the vehicle speed VSO and in step 3300 the actual deceleration DVSO are calculated. The vehicle speed VSO and actual deceleration DVSO may alternatively be obtained on the basis of signals from ordinary wheel speed sensors or a vehicle acceleration sensor, or calculated vehicle speed values in an anti-skid control system, traction control system or trace control system installed together with the braking system may be used.

In step 3400 it is determined whether or not the negative pressure VB has become greater than a predetermined negative pressure value KVB, and when the determination is affirmative processing proceeds to step 3500 on the basis that the negative pressure value of the negative pressure chamber of the booster 2 is closer than atmospheric pressure and the booster is nonfunctional. A predetermined negative pressure value KVB of for example 0.7 bar may be employed. Next, in step 3500, it is determined if the vehicle speed VSO is greater than a predetermined vehicle speed KVSO. At this time, any predetermined vehicle speed KVSO with which it is possible to determine whether or not the vehicle is travelling may be used. In step 3600, it is determined whether or not a stop lamp switch for switching the stop lamp lights on when the brake pedal has been depressed more than a predetermined amount and the vehicle is essentially in a braking state has been turned on. If the stop lamp switch has been turned on, processing proceeds to step 3700. When a negative determination is made in any of steps 3400 to 3600, processing proceeds to step 4000 and control termination processing is carried out. At this time, control the same as the flow chart of FIG. 4 may be used.

In step 3700, a pressure increase control 1 is executed. In this pressure increase control 1, pressure increase control is carried out irrespective of the magnitude of depression of the brake pedal by the driver such as the pedal stroke. In this pressure increase control, for example control is carried out so that in FIG. 1 the pump 10 is driven and the control valve 34 is held open or the valve position thereof is switched at a certain duty ratio. This pressure increase control 1 may be executed for a predetermined time and after that processing may proceed to step 3800.

In step 3800 it is determined whether or not the vehicle deceleration DVSO has become greater than a predetermined deceleration KDVSO. This predetermined deceleration KDVSO is set to a deceleration of a level outputted when the booster is normal and normal pedal depression has been carried out by the driver, and is for example set to about 0.3 G. Here, when the determination is negative, processing returns to step 3700 and continues to carry out the pressure increase control 1.

When in step 3800 the determination is affirmative, processing proceeds to step 3900 and a pressure increase control 2 is carried out. As this pressure increase control 2, control the same as the control described with reference to FIG. 3 may be carried out. That is, the brake fluid pressure acting on the wheel cylinders may be increase (assisted) in correspondence with the state of operation of the brake pedal by the driver. In this flow chart also, the brake pedal stroke or the master cylinder pressure may be used as the operating amount of the brake pedal.

Figure 18:
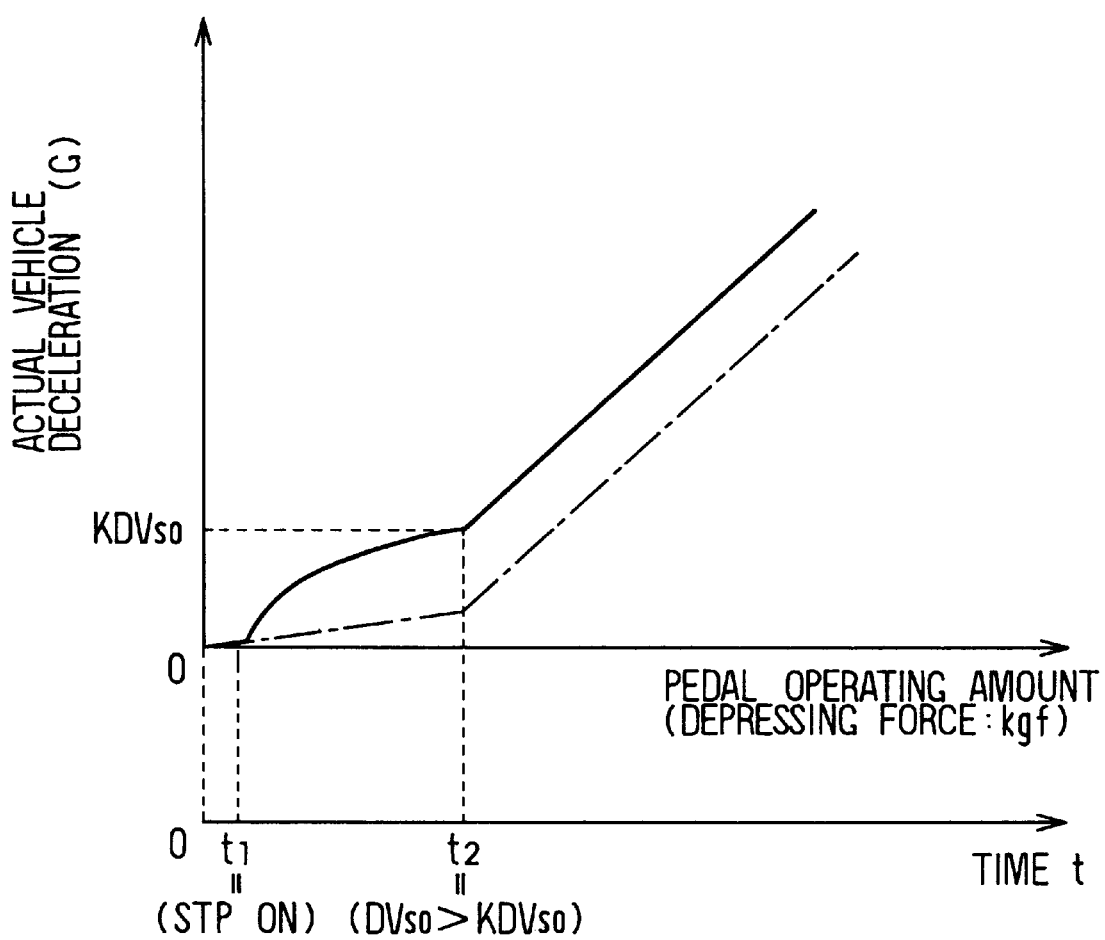
FIG. 18 is a time chart showing variations in deceleration and pedal stroke in the flow chart of FIG. 17.

When control is carried out according to the flow chart of FIG. 17, the kind of characteristic shown in FIG. 18 is obtained. Here it will be supposed that at time t1 the brake pedal has been substantially depressed and the stop lamp switch has been turned on, and that at this time the conditions of steps 3400 and 3500 are satisfied and it has been determined that the booster is nonfunctional. Then, with some calculation time lag and control execution lag, the pressure increase control 1 is carried out, and as long as the brake pedal is being depressed even a little by the driver, assisting is provided until the deceleration of the vehicle reaches the predetermined deceleration KDVSO at time t2, irrespective of the pedal depression stroke. Consequently, whereas when the booster is nonfunctional the brake pedal feels very heavy and if control corresponding to the brake pedal stroke is carried out a state arises such that almost no deceleration is obtained between time t1 and t2, as shown by the broken line in FIG. 18, in the present flow chart, because the braking force is supplemented until the predetermined deceleration KDVSO is obtained, it is possible to secure initial braking between time t1 and time t2 even when the booster is nonfunctional. If the vehicle deceleration rises above the predetermined deceleration KDVSO, because a braking force of a normal braking level is being obtained, pressure increase control is carried out in correspondence with the operation of the pedal by the driver and any feeling of incongruity of braking is minimized.

Figure 19:
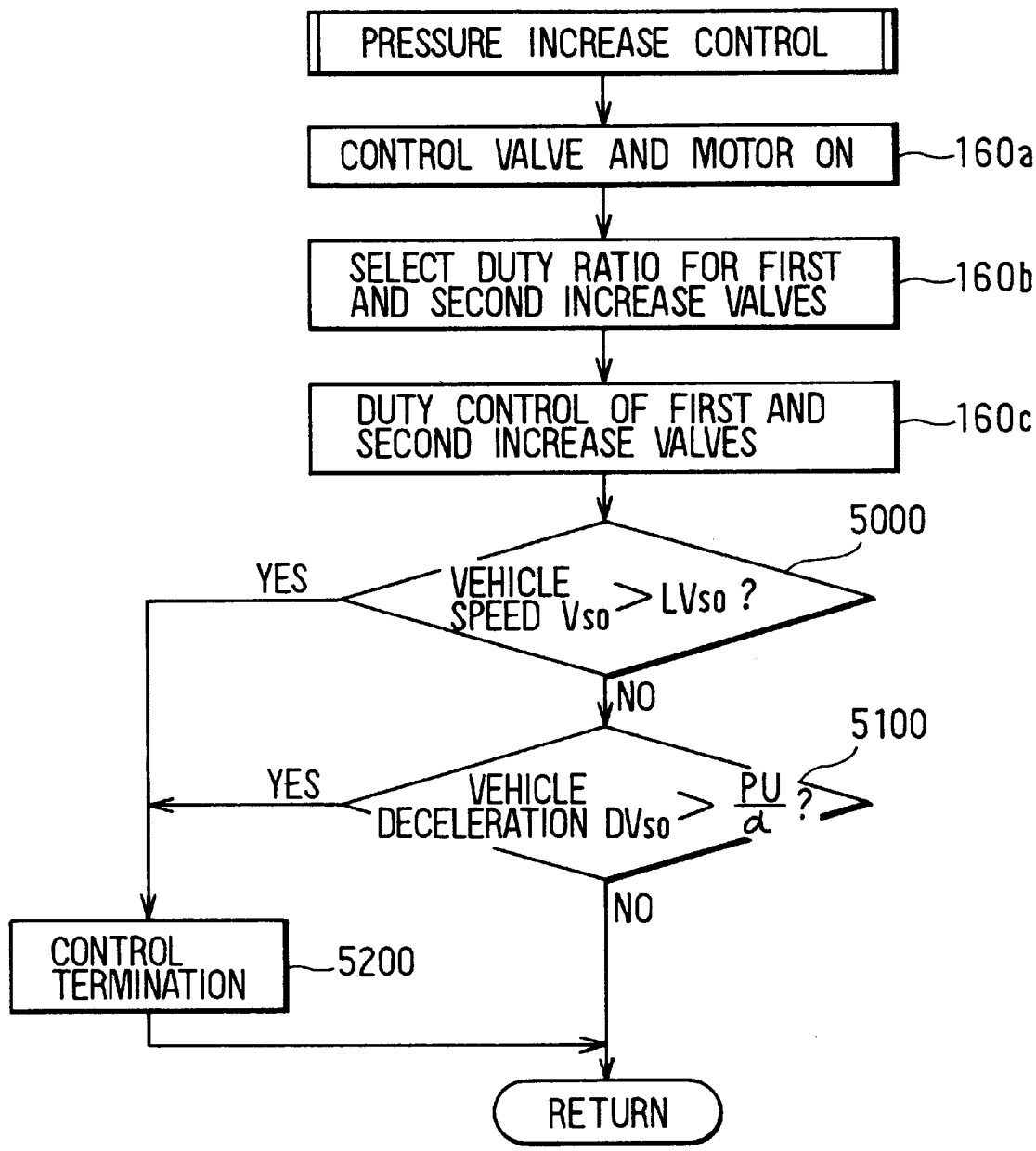
FIG. 19 is a flow chart of processing in another preferred embodiment.

[5] Next, another preferred embodiment of pressure increase control will be described with reference to the flow chart of FIG. 19.

From steps 160a to 160c is the same as described with reference to FIG. 3. In step 5000, the vehicle speed VSO is compared with a predetermined vehicle speed LVSO. The vehicle speed VSO may be calculated on the basis of wheel speeds.

When it is determined in step 5000 that the vehicle speed VSO is greater than the predetermined processing proceeds processing proceeds to step 5200 and control termination processing is carried out. When on the other hand the vehicle speed VSO is lower than the predetermined vehicle speed LVSO, processing proceeds to step 5100 and it is determined whether or not the vehicle deceleration VDSO is greater than a predetermined value PU/α based on the master cylinder pressure PU. A differential value of the vehicle speed VSO may be used as the vehicle deceleration DVSO. As a result, it is possible to determine whether the present vehicle deceleration is a value suited to the master cylinder pressure. A value α may be a fixed value and can be set according to vehicle parameters. In this later case, the value a should be set according to the braking force (wheel braking force value) that can be generated with a predetermined master cylinder pressure in view of such factors as the wheel cylinder diameter. These steps 5000, 5100 carry out determinations for stopping pressure increase control. When in step 5100 a negative determination is made, execution of pressure increase control is continued.

What is claimed is:

1. A brake system for a vehicle, comprising:

a brake pedal operated by a driver to apply a braking force to the vehicle;

a brake fluid pressure generating device for generating brake fluid pressure in correspondence with a state of operation of said brake pedal;

a braking force generating device for receiving said brake fluid pressure and generating wheel braking forces in vehicle wheels;

operation state detecting means for detecting the state of operation of said brake pedal;

reference braking state setting means for setting a reference deceleration in correspondence with the state of operation of said brake pedal;

actual braking state detecting means for detecting an actual deceleration of at least one of said vehicle and said vehicle wheels;

comparing means for comparing said reference deceleration and said actual deceleration; and controlling means for increasing said brake fluid pressure to be received by said braking force generating device when said reference deceleration is larger than said actual deceleration by a given amount.

2. A braking system for a vehicle according to claim 1, wherein said operation state detecting means is a pedal movement amount detecting means for detecting an amount of movement of said brake pedal.

3. A braking system for a vehicle according to claim 1, wherein said operation state detecting means is a pedal depressing force detecting means for detecting a depressing force applied to said brake pedal.

4. A braking system for a vehicle according to claim 1, wherein said determining means comprises pedal operation amount detecting means for detecting an amount of operation of said brake pedal by said driver and comparing means for comparing said amount of operation of said brake pedal detected by said pedal operation amount detecting means with a preset reference pedal operation amount, and when in the comparing means said amount of operation of said brake pedal detected by said pedal operation amount detecting means is greater than said reference pedal operation amount, said controlling means increases brake fluid pressure acting on said braking force generating device.

5. A braking system for a vehicle according to claim 1, wherein said brake fluid pressure generating device includes a booster for causing said brake fluid pressure to be generated in a manner that said state of operation of said brake pedal is boosted at a predetermined ratio.

6. A braking system for a vehicle according to claim 1, wherein:
said brake fluid pressure generating device is a booster for boosting said state of operation of said brake pedal; and
said operation state detecting means comprises reference pressure setting means for detecting a state of functioning of said booster and setting a reference pressure corresponding to this state of functioning, pressure detecting means for detecting a master cylinder pressure varying in correspondence with said state of operation of said brake pedal and comparing means for comparing a detecting master cylinder pressure with said reference pressure, wherein when in said comparing means said master cylinder pressure detected by said pressure detecting means is greater than said reference pressure said controlling means increases brake fluid pressure acting on said braking force generating device.

7. A braking system for a vehicle according to claim 1, further comprising a conduit connected to said braking force generating device, wherein said controlling means is a pressure amplifying means for reducing by a predetermined amount the brake fluid generating brake fluid pressure in said conduit and transmitting brake fluid of said reduced amount to said braking force generating device.

8. A braking system for a vehicle according to claim 1, further comprising a conduit connected to said braking force generating device, wherein said conduit comprises a first conduit provided with a first brake fluid pressure and a second conduit provided with a second brake fluid pressure made higher than said first brake pressure by an amount of brake fluid being moved thereto from said first conduit, and said controlling means is a pressure amplifying means for applying said second brake fluid pressure to said braking force generating device.

9. A braking system for a vehicle according to claim 1, further comprising a conduit connected to said braking force generating device, wherein said conduit comprises a first conduit provided with a third brake fluid pressure reduced to below a first brake fluid pressure as a result of the brake fluid generating said first brake fluid pressure being reduced from said first conduit and a second conduit provided with a second brake fluid pressure made higher than said first brake fluid pressure by an amount of brake fluid being moved thereto from said first conduit, and said controlling means is a pressure amplifying means for applying said second brake fluid pressure to said braking force generating device.

10. A braking system for a vehicle according to claim 8, wherein said pressure amplifying means comprises holding means for holding a differential pressure between said second brake fluid pressure in said second conduit and said first brake fluid pressure in said first conduit.

11. A braking system for a vehicle according to claim 8, wherein said pressure amplifying means comprises holding means for holding in said second conduit said second brake fluid pressure made higher than said first brake pressure.

12. A braking system for a vehicle according to claim 8, wherein said pressure amplifying means comprises holding means for holding brake fluid pressure in said second conduit higher than said first brake fluid pressure in said first conduit by causing brake fluid to flow from said second conduit into said the first conduit while attenuating brake fluid pressure from said second brake fluid pressure to said first brake fluid pressure.

13. A braking system for a vehicle according to claim 8, wherein said pressure amplifying means comprises holding means for holding said second brake fluid pressure at a pressure ratio corresponding to said first brake fluid pressure.

14. A braking system for a vehicle according to claim 10, wherein said pressure amplifying means comprises brake fluid moving means for moving brake fluid from said first conduit into said second conduit.

15. A braking system for a vehicle according to claim 10, wherein said holding means is a proportioning control valve which attenuates brake fluid pressure at a predetermined ratio and transmits into said first conduit brake fluid pressure of said second conduit.

16. A braking system for a vehicle, comprising:
a brake pedal operated by a driver to apply a braking force to the vehicle;
a brake fluid pressure generating device for generating brake fluid pressure in correspondence with an amount of operation of said brake pedal;
a braking force generating device for receiving said brake fluid pressure and generating wheel braking forces in vehicle wheels;
determining means for determining whether the state of braking of the vehicle corresponds to the state of operation of the brake pedal; and
controlling means for increasing brake fluid pressure acting on said braking force generating device when said determining means determines that the state of braking of the vehicle does not correspond to the state of operation of said brake pedal;
wherein said brake fluid pressure generating device is a booster for boosting said state of operation of said brake pedal; and
said determining means comprises reference pressure setting means for detecting a state of functioning of said booster and setting a reference pressure corresponding to this state of functioning, pressure detecting means for detecting a master cylinder pressure varying in correspondence with said state of operation of said brake pedal and comparing means for comparing a detected master cylinder pressure with said reference pressure, wherein when in said comparing means said master cylinder pressure detected by said pressure detecting means is greater than said reference pressure said controlling means increases brake fluid pressure acting on said braking force generating device.

17. A braking system for a vehicle, comprising:
a brake pedal operated by a driver to apply a braking force to the vehicle;

a brake fluid pressure generating device for generating brake fluid pressure in correspondence with an amount of operation of said brake pedal;

a braking force generating device for receiving said brake fluid pressure and generating wheel braking forces in vehicle wheels;

determining means for determining whether the state of braking of the vehicle corresponds to the state of operation of the brake pedal;

controlling means for increasing brake fluid pressure acting on said braking force generating device when said determining means determines that the state of braking of the vehicle does not correspond to the state of operation of said brake pedal; and a conduit connected to said braking force generating device;

wherein said controlling means is a pressure amplifying means for reducing by a predetermined amount the brake fluid generating brake fluid pressure in said conduit and transmitting brake fluid of said reduced amount to said braking force generating device.

18. A braking system for a vehicle, comprising:

a brake pedal operated by a driver to apply a braking force to the vehicle;

a brake fluid pressure generating device for generating brake fluid pressure in correspondence with an amount of operation of said brake pedal;

a braking force generating device for receiving said brake fluid pressure and generating wheel braking forces in vehicle wheels;

determining means for determining whether the state of braking of the vehicle corresponds to the state of operation of the brake pedal;

controlling means for increasing brake fluid pressure acting on said braking force generating device when said determining means determines that the state of braking of the vehicle does not correspond to the state of operation of said brake pedal; and a conduit connected to said braking force generating device;

wherein said conduit comprises a first conduit provided with a first brake fluid pressure and a second conduit provided with a second brake fluid pressure made higher than said first brake pressure by an amount of brake fluid being moved thereto from said first conduit, and said controlling means is a pressure amplifying means for applying said second brake fluid pressure to said braking force generating device.

19. A braking system for a vehicle, comprising:

a brake pedal operated by a driver to apply a braking force to the vehicle;

a brake fluid pressure generating device for generating brake fluid pressure in correspondence with an amount of operation of said brake pedal;

a braking force generating device for receiving said brake fluid pressure and generating wheel braking forces in vehicle wheels;

determining means for determining whether the state of braking of the vehicle corresponds to the state of operation of the brake pedal;

controlling means for increasing brake fluid pressure acting on said braking force generating device when said determining means determines that the state of braking of the vehicle does not correspond to the state of operation of said brake pedal; and a conduit connected to said braking force generating device;

wherein said conduit comprises a first conduit provided with a third brake fluid pressure reduced to below a first brake fluid pressure as a result of the brake fluid generating said first brake fluid pressure being reduced from said first conduit and a second conduit provided with a second brake fluid pressure made higher than said first brake fluid pressure by an amount of brake fluid being moved thereto from said first conduit, and said controlling means is a pressure amplifying means for applying said second brake fluid pressure to said braking force generating device.

20. A braking system for a vehicle according to claim 18, wherein said pressure amplifying means comprises holding means for holding a differential pressure between said second brake fluid pressure in said second conduit and said first brake fluid pressure in said first conduit.

21. A braking system for a vehicle according to claim 18, wherein said pressure amplifying means comprises holding means for holding in said second conduit said second brake fluid pressure made higher than said first brake pressure.

22. A braking system for a vehicle according to claim 18, wherein said pressure amplifying means comprises holding means for holding brake fluid pressure in said second conduit higher than said first brake fluid pressure in said first conduit by causing brake fluid to flow from said second conduit into said the first conduit while attenuating brake fluid pressure from said second brake pressure to said first brake fluid pressure.

23. A braking system for a vehicle according to claim 18, wherein said pressure amplifying means comprises holding means for holding said second brake fluid pressure at a pressure ratio corresponding to said first brake fluid pressure.

24. A braking system for a vehicle according to claim 20, wherein said pressure amplifying means comprises brake fluid moving means for moving brake fluid from said first conduit into said second conduit.

25. A braking system for a vehicle according to claim 20, wherein said holding means is a proportioning control valve which attenuates brake fluid pressure at a predetermined ratio transmits into said first conduit brake fluid pressure of said second conduit.

* * * * *